(12) United States Patent
Pommer et al.

(10) Patent No.: US 9,151,916 B2
(45) Date of Patent: Oct. 6, 2015

(54) COMPACT OPTICAL PACKAGE MADE WITH PLANAR STRUCTURES

(75) Inventors: Richard J. Pommer, Carlsbad, CA (US); Joseph F. Ahadian, San Marcos, CA (US); Charles B. Kuznia, Encinitas, CA (US); Richard T. Hagan, Mission Viejo, CA (US)

(73) Assignee: Ultra Communications, Inc., Vista, CA (US)

( * ) Notice: Subject to any disclaimer, the term of this patent is extended or adjusted under 35 U.S.C. 154(b) by 57 days.

(21) Appl. No.: 14/117,850

(22) PCT Filed: May 15, 2012

(86) PCT No.: PCT/US2012/037894
§ 371 (c)(1),
(2), (4) Date: Nov. 14, 2013

(87) PCT Pub. No.: WO2012/158671
PCT Pub. Date: Nov. 22, 2012

(65) Prior Publication Data
US 2014/0099059 A1    Apr. 10, 2014

Related U.S. Application Data

(60) Provisional application No. 61/486,627, filed on May 16, 2011.

(51) Int. Cl.
*G02B 6/42* (2006.01)
(52) U.S. Cl.
CPC ............ *G02B 6/4219* (2013.01); *G02B 6/4201* (2013.01)

(58) Field of Classification Search
CPC .......................................................... G02B 6/42
USPC ...................................................... 385/42, 52
See application file for complete search history.

(56) References Cited

U.S. PATENT DOCUMENTS

| 7,832,944 | B2 | 11/2010 | Hosking | |
|---|---|---|---|---|
| 2003/0201462 | A1* | 10/2003 | Pommer et al. | 257/200 |
| 2004/0033006 | A1* | 2/2004 | Farah | 385/14 |
| 2006/0045410 | A1 | 3/2006 | Trott | |
| 2006/0151859 | A1* | 7/2006 | Karkkainen | 257/671 |
| 2006/0239605 | A1* | 10/2006 | Palen et al. | 385/14 |
| 2008/0089637 | A1* | 4/2008 | Farah | 385/14 |
| 2008/0247703 | A1* | 10/2008 | Kodama et al. | 385/14 |

(Continued)

OTHER PUBLICATIONS

International Application No. PCT/US2012/037894, International Search Report and Written Opinion dated Aug. 14, 2012 (8 p.).

*Primary Examiner* — Kaveh Kianni
(74) *Attorney, Agent, or Firm* — Jonathan A. Kidney; TechLaw, LLP (57) ABSTRACT

A device structure and system for connecting optical waveguides to optical transmit and receive components is described. The structure is made of two parts. The lower part contains active optoelectronic components, such as lasers and photodetectors, and optical lenses. The lower part can be assembled by steps of aligning and bonding planar components. The upper part contains optical waveguides and lenses for coupling light into and out of the waveguides. The top part is mechanically connected to the lower part to form a mechanically sound connection. The lens system provides some tolerance to mis-alignment between the top and bottom parts. The system has features that enable fiber optic components to operate and survive in harsh environments, particularly large temperature extremes.

19 Claims, 5 Drawing Sheets

(56) References Cited

U.S. PATENT DOCUMENTS

2010/0035052 A1* 2/2010 Farah .......................... 428/336
2010/0118421 A1 5/2010 Woodard
2011/0013865 A1 1/2011 Shibata
2011/0044369 A1 2/2011 Andry

* cited by examiner

FIG. 5

COMPACT OPTICAL PACKAGE MADE WITH PLANAR STRUCTURES

CLAIM OF PRIORITY

This application is a U.S. National Stage Filing under 35 U.S.C. 371 from International Patent Application Serial No. PCT/US2012/037894, filed May 15, 2012, and published on Nov. 22, 2012 as WO 2012/158671 A1, which claims the benefit of priority to U.S. Provisional Patent Application No. 61/486,627, filed May 16, 2011, the contents of each of which are hereby incorporated by reference in their entireties.

FIELD

The invention relates to the field of fiber optics and fiber optics operating in a harsh environment, such as non-temperature controlled or exposed to moisture.

BACKGROUND

Fiber optics offers high data rate, low weight and electromagnetic interference immunity for data communications, making it suitable for use in modern aircraft, helicopters, unmanned avionic vehicles, space-craft and missiles. These platforms require sensor and control data to be distributed throughout the system. Fiber optic components must be able to operate and survive in this environment. Fiber optic components must be made in compact packages to fit within strictly defined physical envelopes.

Fiber optic components in this environment may become damaged. The component can be constructed with a 'fixed pigtail', a short run of fiber that is permanently attached to the component. Often, components designed for harsh environments have a fixed pigtail that passes through a hermetically sealed can. The electronic and optoelectronic (OE) devices (e.g., PIN detectors, lasers, and LEDs) are contained inside the sealed can.

The process of making a hermetic pass-thru of the fiber is expensive, consumes considerable package volume, and is not compatible with re-work. Some fiber components use a ribbon made up of multiple fibers (typically 12). The process sealing the ribbon fiber feed-thru is much more difficult and expensive than a single fiber.

Fiber optic strands are lightweight, but they are also fragile. The pigtail can be damaged in the process of manufacturing the component, in the process of fielding the component and in the process of operating the component in the field. If the fiber pigtail is damaged the fiber can be cut and re-connectorized, or in some cases it can be 'fused' back together. This is a process that requires the component to be removed from the system and the repair work is done at a specialized facility. This process is only possible if the damage to the fiber is some distance from the component. It is not possible to fix damage that occurs near the component, since some run of fiber must be available for re-connectorizing and/or fusing. In many cases the fiber cannot be repaired and the entire fiber optic component must be replaced.

Fiber optic connectors are typically not compatible with a solder reflow process. Therefore, if another component on a printed wiring board needs to be replaced, the fiber optic component must be removed prior to solder re-work. This additional handling of the fiber optic component also exposes the fiber pigtail to damage.

Therefore, there has been a long standing need for system(s) and method(s) for providing a fiber optic interface that can be easily re-worked or connectorized, without disrupting the hermetic seal of the electronic/OE device, which would avoid the cost and inconvenience of fiber pigtail damage. Various system(s) and method(s) addressing these and other deficiencies are detailed in the following description.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the present disclosure, an optical core (CORE) sub-assembly allowing an optoelectronic (OE) device on a supporting substrate to be precisely aligned with a fiber optic assembly is provided, comprising: a first substrate bonded to a supporting substrate with an OE, the first substrate having an optically transparent portion and a first alignment feature, the first alignment feature allowing the optically transparent portion to be aligned with the OE device to within a predetermined first tolerance; a second substrate bonded to an opposite side of the first substrate, the second substrate having a lens and a second alignment feature, the second alignment feature allowing the lens to be aligned with the optically transparent portion of the first substrate to within a predetermined second tolerance; and a third substrate bonded to an opposite side of the second substrate, the third substrate having a transparent portion and a third alignment feature, the third alignment feature allowing a fiber optic assembly to be aligned with the transparent portion to within a predetermined tolerance, wherein the first, second and third alignment features maintain an alignment of an optical ray between the OE and the fiber optic assembly, and wherein by selection of a material type for the first, second, and third substrate, the substrates have a coefficient of thermal expansion (CTE) that match within approximately +/−5 ppm/C.

In another aspect of the present disclosure, the optical core (CORE) sub-assembly's alignment of the optical ray between the OE and the fiber optic assembly is maintained between a temperature range of approximately −55 C to +100 C; and/or the bond between the first substrate and the supporting substrate bond is a flip-chip bond; and/or the third substrate and an inverted second substrate are formed as a single substrate, and adhesively bonded to the first substrate; and/or the third substrate is a hybrid, comprising a lens guide substrate and a seal substrate, wherein the seal substrate is bonded to the second substrate, sealing the lens; and/or the second substrate is a hybrid, comprising a seal substrate and lens substrate; and/or the lens structure is recessed into the substrate to form an air gap.

In another aspect of the present disclosure, the optical core (CORE) sub-assembly's lens in the second substrate is sealed and protected from external exposure by a transparent seal substrate; and/or the seal substrate contains an alignment feature to provide alignment with the second alignment feature of the second substrate; and/or the second substrate contains a depression on its top surface to accommodate an adhesive; and/or the bond between the third substrate to the second substrate is bonded using a wafer level bonding approach; and/or the transparent portion is an opening in the third substrate; and/or the first alignment feature of the first substrate is used for alignment with the OE.

In yet another aspect of the present disclosure, the optical core (CORE) sub-assembly's first, second and third alignment features provide alignment up to a mismatch of 10 microns between the respective substrates; and/or the first, second alignment features provide an alignment precision, between the lens and the OE, of approximately 3 microns or less; a fiber termini lens of the fiber optic assembly can be misaligned up to 40 microns with respect to the lens of the second substrate and still provide efficient optical coupling between a waveguide in the fiber optic assembly and the OE; and/or the third alignment feature is a keying feature that mates to the fiber termini lens; and/or the OE is at least one of a photo-detector and a laser, and a total height of the sub-assembly is less than 10 mm; and/or further comprises at least a plurality of lenses in the second substrate and a plurality of fiber optic lines in the fiber optic assembly; and/or further comprises at least one of an integral temperature sensor and monitoring photodetector disposed between the first substrate and the supporting substrate.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings. As such, other aspects of the disclosure are found throughout the specification.

DETAILED DESCRIPTION

U.S. Pat. No. 5,815,619 to Bloom titled "Fiber Optic Connector Hermetically Terminated" and U.S. Pat. No. 6,445,867 to Gilliland et al. titled "Optical Fiber Hermetic Termination Connector" are hereby incorporated by reference in their entirety.

Introduction

A system of providing a fiber optic interface that can be easily re-worked or connectorized would avoid the cost and inconvenience of fiber pigtail damage. In such a system, the pigtail could be easily attached and removed from the fiber optic component. The process of attaching and removing the pigtail should not disrupt the hermetic seal of the electronic and OE devices.

Maintaining the alignment of OE devices, lenses and the optical fiber in a non-temperature controlled environment is challenging. The OE devices are typically formed in an III-V material with a coefficient of thermal expansion (CTE) below 6 ppm/C. The lenses that couple light between the OE devices and fibers are typically molded in a plastic material with a coefficient of thermal expansion (CTE) above 30 ppm/C. This large difference in CTE causes issues of maintaining alignment over temperature. One exemplary method of accommodating the CTE mis-match is, as illustrated further below, to use a two lens approach: one lens in an underlying substrate fabricated in material close to the CTE of the OE devices and precisely aligned to the OE device, and a second lens in an overlaying substrate fabricated in a material close to the CTE of the material holding the fiber and precisely aligned to the fiber. In some instances, the same material can be used to hold the fiber and form the lens in the overlaying substrate. The overlaying substrate can have mechanical features that allow expansion of the respective components as they thermally expand and contract, such as, a non-limiting example being a series of radially oriented slots. This lens system forms a 'collimated' or 'expanded' beam interface that is tolerant to misalignment.

The alignment problem is more severe in fiber optic components that utilize multiple, parallel channels. The OE devices are formed as an array. The lens system must couple an array of OE devices to an array of fibers, using an array of lenses. Maintaining alignment of these arrays of devices is more difficult than in single channel fiber optic components.

Commercial telecom components in hermetically sealed cans do not meet aerospace size requirements, are expensive (due to low yield), and cannot be connectorized (i.e., components are delivered with a fragile fiber pigtail). In contrast, commercial datacom components (used for links less than 300 meters) are well suited for aerospace applications, but are not presently qualified for harsh environments. Datacom components, if properly accommodated for, can be packaged within small, ruggedized packages with connectorized pigtails to achieve the same performance requirements over a wide temperature range, at a fraction of the power consumption and price tag.

Ideally a compact, rugged fiber optic product line would be manufactured using practices and sub-components found in the commercial datacom industry. A manufacturing process using flip-chip bonding techniques can perform the key optical alignment steps. For example, a flip-chip bonder with sub-micron placement accuracy can be used for the following assembly steps: 1) Laser and PIN array bonding to a transparent carrier, 2) transparent carrier bonding to a ceramic carrier substrate, and 3) lens bonding to the transparent carrier.

Discussion

The optical interconnect system, the assembly method of utilizing precision aligned sub-components to build robust, low-cost fiber optic modules are described in this application.

This system creates optical components that are sealed against environmental elements and can be connected to a fiber optical cable. This system has an optical core (CORE) sub-assembly designed for high-reliability applications. The CORE contains the precision alignment and assembly of OE devices, integrated circuitry (optional) and lens devices onto a carrier containing wire-bond pads or other standard electrical interface. The CORE eases assembly requirements for incorporation into a fiber optic module by providing a wire-bondable electrical interface and an optical interface with relaxed alignment tolerances.

The CORE can be manufactured using a process that comprises the following main steps: 1) flip-chip bonding of OE devices on a first transparent substrate, 2) flip-chip bonding of a lens (formed on a second transparent substrate) aligned to features on the OE devices or on the first transparent substrate, 3) flip-chip bonding a third substrate containing mechanical features to mate to a fiber optic cable. The third substrate has areas that are transparent and can also form a seal for the lens on the second substrate. The third substrate has features used for alignment to the second substrate, for used in a flip-chip bonding machine, for example.

This splits the manufacturing into two areas that can be distinguished by the assembly tolerances and material CTEs. The creation of the CORE and a top cable assembly requires tight (<10 micron) alignment of the substrate components outlined in the 3 steps above. The remaining steps can have relatively loose tolerances (>10 microns), including the attachment of the fiber cable assembly to the CORE.

This system provides for alignment marks on a transparent substrate to allow passive alignment of the lasers (including vertical cavity surface emitting lasers—VCSELs) to the transparent substrate. A precision of less than 3 microns can be achieved. This system may contain alignment marks on the transparent substrate for lens alignment, to also achieve precision of less than 3 microns.

The top cable assembly can be held in place, for example, with an epoxy. This can be a semi-permanent attachment, allowing the top cable assembly to be replaced if necessary. The top cable assembly can be held in place, for example, with a connector mechanism. The connector mechanism can apply a load, for example, a spring, to hold the lens in place during operation in an environment with vibration, shock and thermal excursions. The spring load can be supplied with a spring supported by a frame, which in turn is attached to the base of the module (either a printed wiring board or ceramic substrate). This system can create an optical module with less than 10 mm of overall height.

This system can create an optical module that would operate in a wide temperature range, approximately −55 C to 100 C. The CORE can be configured to have a 'delta-T' (temperature difference between the laser and case) of less than 10 C. One embodiment of the system would allow operation up to approximately 125 C by incorporating an active cooling element on the laser device.

This system can create optical modules that are sealed with traditional methods of welding a lid on a can or newer methods that utilize atomic layer deposition (ALD) or fusion wafer bonding, or other methods.

A two part lens system can be devised to have features at a 'parting interface' to aid in bringing the two lenses into alignment. The light signals are collimated (approximately a column of light, neither diverging nor converging) at the parting interface. This relaxes the alignment in the axis that the light is traveling, accommodating for distances up to 10 mm between these parting surfaces. This allows for transparent substrates, planar on both sides, to be inserted between the two lenses. Also, mechanical alignment features can be formed on the two lenses to bring the two lenses into alignment when mated.

The two part lens can be mated on either side of a window that forms a seal to the electronics and the CORE. For example, the electronics and the CORE can be inside a hermetically can. The window can have mechanical features, either formed in the window or formed in a second material and attached to the window, that can mate to either or both of the lenses. For example, a frame could have features that bring it into alignment with the fiber cable assembly and this frame could be attached to the window, allowing the fiber cable assembly to then be simply aligned to the frame.

The system can have a slightly frosted surface at the parting surfaces of the lens. This frosted surface allows a camera to see a 'spot' formed by a light at this surface. The laser can be turned on during alignment creating a spot on one parting surface. The fibers can be lit up to create a spot on the second parting surface. A flip-chip bonder can use these spots to bring the two lenses into alignment and they can be bonded together. The bonding method may be an epoxy that can be later removed for re-work, for example a silicone-type epoxy.

Another method of aligning the top cable assembly is to form keying feature in a window after the CORE has been assembled inside a can with a window. Pattern recognition software driving a short-wavelength laser can find features on the CORE and the laser can etch mechanical keying features into the window. These features can serve at the mating interface to the top cable assembly.

The materials used in the CORE (laser, transparent carrier, lens, and optional interposer) and metal can (or optional support frames and windows) can be chosen to have a matching CTE (within approximately +/−5 ppm/C). Example materials are GaAs, sapphire, ceramic (including low-temperature co-fired cermic—LTCC), BK-7, ZnSe, and Kovar® (trademarked by Carpenter Technology Corp.) A module constructed of these materials would have minimal stresses on the seals in all dimensions (X, Y, and Z), including any stress imparted by CORE structure in contact with the window (above) and floor of the module (either a ceramic substrate, metal can floor or combination of the two). The following Figures are presented, explaining various details and examples of the features described above.

Figure 1:
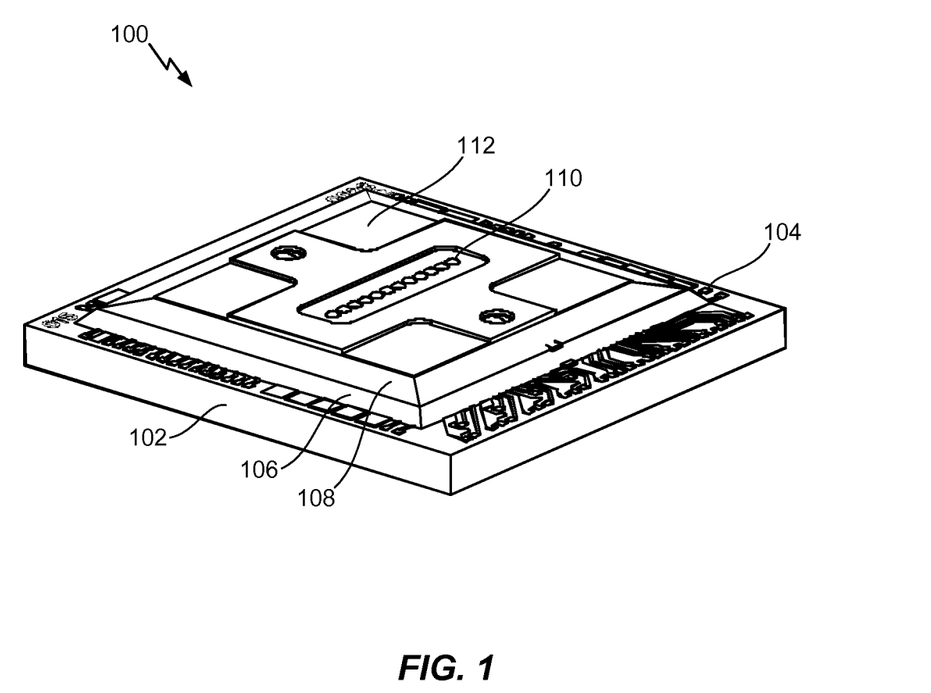
FIG. 1 is an illustration of an exemplary component with a collimated optical beam interface and wire-bonds for electrical contacts.

FIG. 1 shows an example of an exemplary component with a collimated optical beam interface and wire-bonds for electrical contacts. The system 100 contains an interposer substrate 102 (also referable as a supporting substrate) that contains electrical connection points 104. An optically transparent substrate 106 is attached to the interposer substrate 102 with electrical bonds (not shown), such as flip-chip bonding pads. The optically transparent substrate 106 contains optoelectronic devices orientated so that light passes through the substrate 106. A lens substrate 108 is aligned to the optoelectronic devices so that the lenses 110 provide efficient optical coupling. For example, the lenses 110 could form a collimated beam from lasers located on the transparent substrate 106. The lens substrate 108 can be bonded to the transparent substrate 106 with a transparent epoxy.

The lens substrate 108 can contain features 112 for containing epoxy (or other material) for purposes of bonding another substrate to the top of the lens substrate 108. The lens substrate 108 can also be provided without features to be substantially planar. This would increase the surface area available for fusion bonding of another substrate to the top of the lens substrate 108 (instead of using epoxy). The lens substrate 108 can also be provided with a metal pattern (not shown) that could be used in a solder attachment of another substrate to the top of the lens substrate 108.

Figure 2:
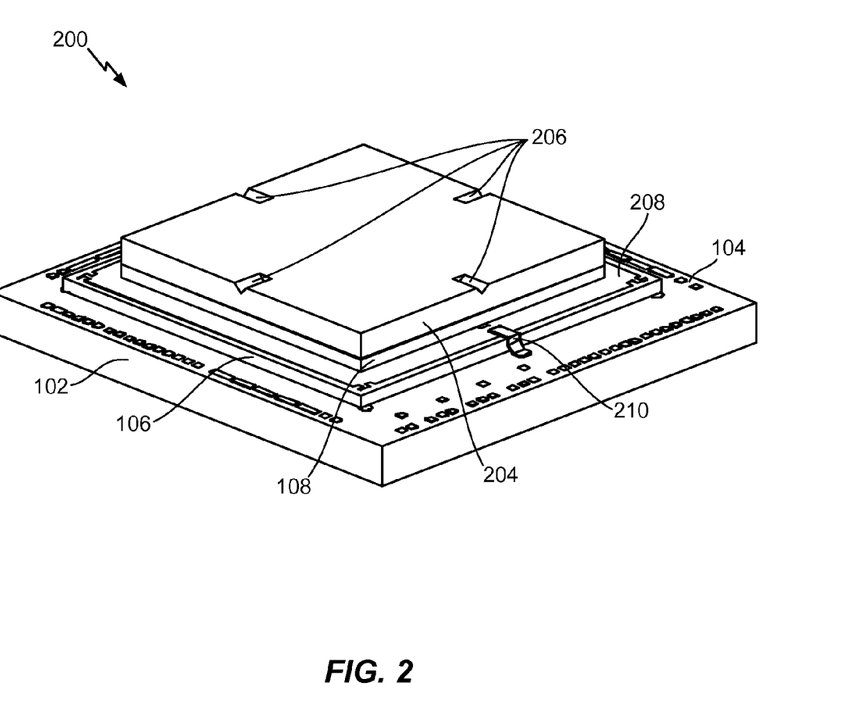
FIG. 2 is an illustration of an exemplary component with a collimated optical beam interface with exemplary features for mechanical alignment to an assembly containing optical waveguides and wire-bonds for electrical contacts.

FIG. 2 shows an exemplary component with a collimated optical beam interface with features for mechanical alignment to an assembly containing optical waveguides and wire-bonds for electrical contacts. The system 200 contains an interposer substrate 102 that contains electrical connection points 104. An optically transparent substrate 106 is attached to the interposer substrate 102 with electrical bonds (not shown). The optically transparent substrate 106 contains optoelectronic devices (not shown) orientated so that light passes through the substrate 106. A lens substrate 108 is aligned to the optoelectronic devices so that the lenses (not shown) provide efficient optical coupling.

A lens guide substrate 204 contains features 206 that can perform mechanical alignment to a component containing optical waveguides. The lens guide substrate 204 can contain features on the bottom side that are aligned to the mechanical features 206 on the top side. These features can be formed at using wafer-level processes to provide precision alignment of the features on both sides of the lens guide substrate 204. The lens guide substrate 204 can be attached to the lens substrate 108 in such a manner to seal the lens devices. This seal may be formed with one or more of several ways, for example, with epoxy, with fusion bonding of wafers or with a solder process. In some embodiments, one or more of the various substrates that compose the exemplary component may be aligned and "fused" together using a wafer-level process to provide the requisite degree of substrate-to-substrate alignment precision and adherence.

A grounding strap 210 can be provided to a metal pattern 208 on the top side of the transparent substrate 106. The metal pattern 208 can provide openings (not shown) for the optical signal to pass through the transparent substrate 106 and onto the lens substrate 108. This grounding strap 210 can provide a ground plane reference for circuitry for enhanced operation in radiation environments, such as in space.

Figure 3:
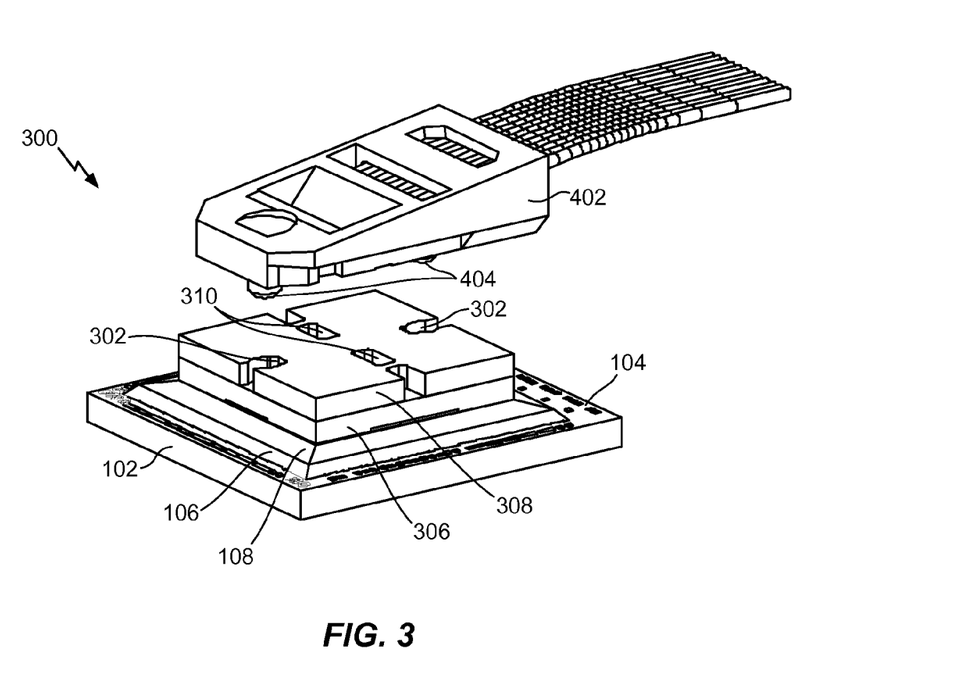
FIG. 3 is an illustration of an exemplary component with a collimated optical beam interface with features for mechanical alignment to an assembly containing optical waveguides and wire-bonds for electrical contacts with a two layer hybrid substrate.

FIG. 3 shows an exemplary component 300 with a collimated optical beam interface with features for mechanical alignment to an assembly containing optical waveguides and wire-bonds for electrical contacts. The features for mechanical alignment are created on a two layer hybrid substrate. The system contains an interposer substrate 102 that contains electrical connection points 104. An optically transparent substrate 106 is attached to the interposer substrate 102 with electrical bonds. The interposer substrate 102 contains optoelectronic devices orientated so that light passes through the optically transparent substrate 106.

A lens substrate 108 is aligned to the optoelectronic devices so that the lenses provide efficient optical coupling. A lens guide substrate is formed by the combination of two substrates, a transparent lens guide substrate 306 and a mechanical lens guide substrate 308. The transparent lens guide substrate 306 and mechanical lens guide substrate 308 can be bonded together in a wafer-level process to align features on the transparent lens guide substrate 306 and on the mechanical lens guide substrate 308.

The mechanical lens guide substrate 308 can be formed in a material that is easily etched in a wafer scale process and is not necessarily transparent. If the mechanical lens guide substrate 308 is not transparent, regions 310 must be clear to allow optical signals to pass. The mechanical lens guide substrate 308 can contain mechanical features 302 for alignment to features 404 on a component containing optical waveguides 402. Alignment features 404 can be round pins that fit into mechanical features 302. However, these alignment features can be configured to be "cleats" that fit within slots on lens guide substrate 308 that are designed to allow some lateral mechanical expansion due to thermal mismatch.

Lens guide substrate 308 can be fabricated with different connector keying mechanisms that accommodate a large CTE mismatch between the connector and lens guide substrate 308. By way of example, FIG. 2's mechanical alignment features 206 can be used here, which are shown in FIG. 2 as slots that are mated to a connector type (not shown) with correspondingly shaped connector keys that are designed to fit into the slots. The mechanical alignment features 206, in addition to providing alignment, are configured with a shape to allow sliding during expansion between the top fiber connector 402 and the lens guide substrate 308 without causing mechanical stress on the underlying lens substrate 306.

Figure 4:
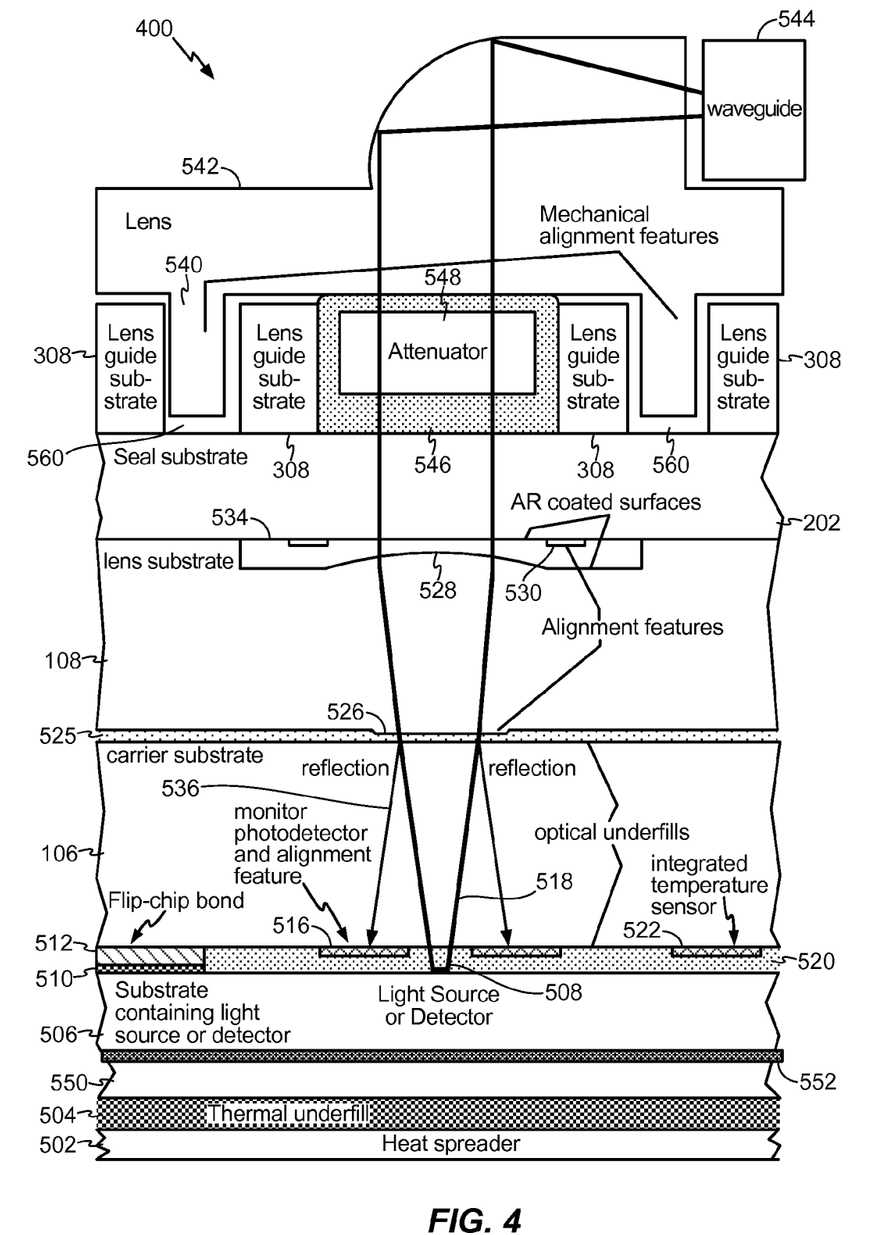
FIG. 4 is a cut illustration of an exemplary layered substrate construction of an exemplary CORE component.

FIG. 4 is an illustration of an exemplary layered substrate construction of the CORE component 400. The heat spreader 502 is an optional substrate for distributing heat to a wider area under the component 500. The heat spreader 502 can be implemented in a material with good thermal conductivity, such as metal. The heat spreader 502 can also be created in a material with a coefficient of thermal expansion (CTE) that is similar to the light source or detector substrate 506.

An optional active cooling/heating element 550 can be placed between the light source or detector substrate 506 and the heat spreader 502, with a thermal interface material 552 making good thermal contact to the light source or detector substrate 506 and a thermal interface material 504 making good thermal contact to the optional heat spreader 502. The light source or detector substrate 506 contains a light source or detector 508. The light source or detector substrate 506 has one or more electrical contacts 510 that are electrically connected to one or more an electrical contacts 512 on a transparent carrier substrate 106.

The transparent carrier substrate 106 can optionally contain an integrated photodetector 516 to monitor light from the light source 508. In one realization of various embodiments, a portion of light 536 from the source 508 is reflected into the integrated photodetector 516 by the optical index discontinuity as light 518 exits the transparent carrier substrate 106. A transparent optical underfill 520 fills the region between the light source or detector substrate 506 and transparent carrier substrate 106. The monitor photodetector 516 can form a feature for aligning the light source or detector 508 during assembly. For example, a flip-chip bonder can bring the light source or detector 508 into alignment with a ring formed by the monitor photodetector 516. These two features are in close proximity to each other once bonded, and therefore can be brought into precision alignment, as they do not create parallax.

The transparent carrier substrate 106 can optionally contain an integral temperature sensor 522 to monitor the temperature of the light source or photodetector 508. The optoelectronic devices can have sensitivity to temperature. The temperature sensor 522 can be used in a control loop to maintain the temperature of or adjust the bias settings of the light source or photodetector 508 to compensate for the environment. For proper coupling, the lens 528 on the lens substrate 108 should be aligned to the light source or detector 508. This accuracy can depend on the application, but alignment of less than 10 microns is typical.

An optional lens alignment feature 526 can be formed on the lens substrate 108 such that it is alignment to the lens 528. This alignment can be performed at the wafer-level using semiconductor techniques of masking and etching. This process can create features on each side of the substrate that are precisely aligned. The lens alignment feature 526 can be used to align the lens 528 to the light source or detector 508. This alignment and bonding can be performed with a flip-chip bonder, for example. The lens 528 surface can have an anti-reflective coating to reduce reflections of light in the light path 518.

A transparent optical underfill 525 can be used to fill the region between the carrier substrate 106 and the lens substrate 108. The lens 528 works optimally with an interface to air. The region between the lens 528 and an optional seal substrate 202 can have an air pocket (not shown) at the lens 528 interface. The seal substrate 202 can form a seal around this air pocket. This seal can be formed by a number of methods that intimately bond the seal substrate 202 to the lens substrate 108. Non-limiting examples of the bonding method are epoxy bonding, wafer fusion bonding or forming a metal ring on the seal substrate 202 and lens substrate 108 and solder joining the two substrates (this is a hermetic seal).

Seal alignment feature(s), can be formed on the seal substrate 202. Seal alignment feature(s) 530 can be formed in a metal process or etching process at the wafer-level. The seal alignment feature(s) 530 can be used to align the seal substrate 202 with the lens 528 on the lens substrate 108 in coordination with lens substrate alignment feature(s) 526. The surface of the seal substrate 534 can be coated with an anti-reflection layer to reduce reflections of light in the light path 518. The surfaces of the lens 528 can be coated with an anti-reflection layer to reduce reflections of light in the light path 518. The seal substrate 202 can contain optional mechanical feature(s) 560 for alignment of a waveguide interface lens 542, commercially referred as a fiber termini lens. The waveguide interface lens 542 can contain one or more mechanisms for coupling light to one or more optical waveguides 544. The mechanical feature(s) 560 can be formed in the seal substrate 202 directly, or on a secondary substrate 308 attached to the seal substrate 202. The secondary substrate 308 and seal substrate 202 can be bonded together at the wafer level to form a single component. The secondary substrate 308 can be formed in material that is suitable for deep etching and not necessarily transparent, for example silicon.

Consequently, the arrangement of the alignment features (both mechanically and optically) that align the lens 528 with the light source or detector 508 allow for a mismatch of 40 microns or more between the waveguide interface lens 542 and the lens 528. It is believed that such misalignment tolerance is not capable in the current state-of-the-art in wide temperature applications.

The bonded seal substrate 202 and secondary substrate 308 can be processed at the wafer-level with steps of masking and etching. This process can create features on both sides of the combination substrate that are precisely aligned. In the regions of the light path 518, the secondary substrate 308 should be completely removed. An optional transparent fill material 546 and an optical attenuator 548 can be placed in this region. The optional optical fill material 546 would protect this region from collecting foreign material. The optical attenuator 548 would allow for reducing the light in the light path 518. This reduction may be needed to meet certain eye safety standards associated with laser sources. The waveguide interface lens 542 can have mechanical feature(s) 540 that align the waveguide interface lens 542 to the mechanical feature(s) 560.

It should be noted, upon inspection of the arrangement of the various substrates and elements in FIG. 4, a single combined substrate may be devised, having a plurality of the mentioned substrates as a single component. For example, based on manufacturing limitations, lens guide substrate 308, seal substrate 202, and lens substrate 108, may be fabricated as single piece, or lens guide substrate 308 and seal substrate 202 fabricated as a single piece. Further, in some embodiments, lens guide substrate 308 may be directly bonded or fabricated, as a single piece, with lens substrate 108. However, in this example, if lens 528 should be sealed in the application, then it is understood the fabrication process may be such that lens substrate 108 may need to be "flipped" so as to have the lens 528 at the "bottom" of the lens substrate 108.

Figure 5:
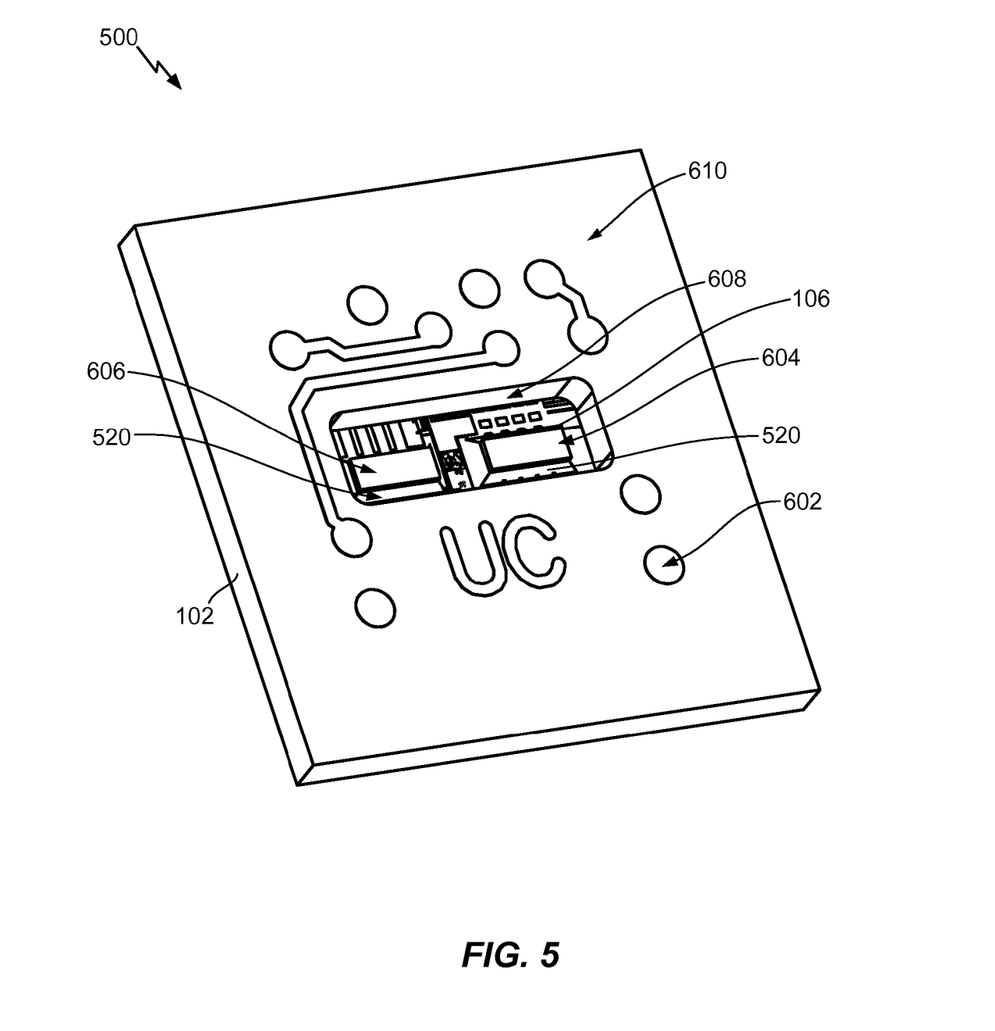
FIG. 5 is an illustration of exemplary test points on the bottom side of an exemplary CORE component.

FIG. 5 is an illustration of exemplary test points on the bottom side of the CORE component 500. The interposer substrate 102 can optionally have electrical pathways through the substrate to bottom side 610. These pathways can create contacts 602 that electrically connect to pathways on the top side of the interposer substrate 102. The interposer substrate 102 has an optional opening 608 thru the interpose substrate 102. The opening 608 gives mechanical relief to light source chips 606 or light detector chips 604. An optical underfill material 520 can be used to underfill the chips that are flip-chip attached to the transparent carrier 106.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An optical core (CORE) sub-assembly allowing an optoelectronic (OE) device on a supporting substrate to be precisely aligned with a fiber optic assembly, comprising:
    a first substrate bonded to a supporting substrate with an OE, the first substrate having an optically transparent portion and a first alignment feature, the first alignment feature allowing the optically transparent portion to be aligned with the OE device to within a predetermined first tolerance;
    a second substrate bonded to an opposite side of the first substrate, the second substrate having a lens and a second alignment feature, the second alignment feature allowing the lens to be aligned with the optically transparent portion of the first substrate to within a predetermined second tolerance; and
    a third substrate bonded to an opposite side of the second substrate, the third substrate having a transparent portion and a third alignment feature, the third alignment feature allowing a fiber optic assembly to be aligned with the transparent portion to within a predetermined tolerance, wherein the first, second and third alignment features maintain an alignment of an optical ray between the OE and the fiber optic assembly, and wherein by selection of a material type for the first, second, and third substrate, the substrates have a coefficient of thermal expansion (CTE) that match within approximately +/−5 ppm/C;
    wherein the third substrate is a hybrid, comprising a lens guide substrate and a seal substrate, wherein the seal substrate is bonded to the second substrate, sealing the lens.

2. The device of claim 1, wherein the alignment of the optical ray between the OE and the fiber optic assembly is maintained between a temperature range of approximately −55 C to +100 C.

3. The device of claim 1, wherein the bond between the first substrate and the supporting substrate bond is a flip-chip bond.

4. The device of claim 1, wherein the third substrate and an inverted second substrate are formed as a single substrate, and adhesively bonded to the first substrate.

5. The device of claim 1, wherein the second substrate is a hybrid, comprising a seal substrate and lens substrate.

6. The device of claim 1, wherein the lens structure is recessed into a substrate to form an air gap.

7. The device of claim 1, wherein the lens in the second substrate is sealed and protected from external exposure by a transparent seal substrate.

8. The device of claim 7, wherein the seal substrate contains an alignment feature to provide alignment with the second alignment feature of the second substrate.

9. The device of claim 1, wherein the second substrate contains a depression on its top surface to accommodate an adhesive.

10. The device of claim 1, wherein the bond between the third substrate to the second substrate is bonded using a wafer level bonding approach.

11. The device of claim 1, wherein the transparent portion is an opening in the third substrate.

12. The device of claim 1, wherein the first alignment feature of the first substrate is used for alignment with the OE.

13. The device of claim 1, wherein the first, second and third alignment features provide alignment up to a mismatch of 10 microns between the respective substrates.

14. The device of claim 1, wherein the first, second alignment features provide an alignment precision, between the lens and the OE, of approximately 3 microns or less.

15. The device of claim 14, wherein a fiber termini lens of the fiber optic assembly can be misaligned up to 40 microns with respect to the lens of the second substrate and still provide efficient optical coupling between a waveguide in the fiber optic assembly and the OE.

16. The device of claim 15, wherein the third alignment feature is a keying feature that mates to the fiber termini lens.

17. The device of claim 1, wherein the OE is at least one of a photo-detector and a laser, and a total height of the sub-assembly is less than 10 mm.

18. The device of claim 1, further comprising at least a plurality of lenses in the second substrate and a plurality of fiber optic lines in the fiber optic assembly.

19. The device of claim 1, further comprising at least one of an integral temperature sensor and monitoring photodetector disposed between the first substrate and the supporting substrate.

* * * * *